Patented June 24, 1941

2,246,980

UNITED STATES PATENT OFFICE 2,246,980

SYNTHESIS OF OLEFIN DERIVATIVES

Henry N. Lyons, Maplewood, N. J., assignor to Cities Service Oil Company, New York, N. Y., a corporation of Pennsylvania No Drawing. Application March 13, 1937, Serial No. 130,801

11 Claims. (Cl. 196—10)

This invention relates to a process of making hydrocarbon compounds from olefins and more particularly from the lower members of the series which are gases at ordinary conditions.

Many processes have been developed for the utilization of olefin hydrocarbon contained in gases produced by the cracking of petroleum oil, the carbonization of coal, and other industrial processes. In general the olefins are recovered from such gases by the use of chemical agents such as sulfuric acid and by polymerization of the olefins to higher boiling hydrocarbons. The polymerization may be effected by means of high temperatures alone or by means of catalysts and more moderate temperatures.

The primary object of the present invention is to provide an improved process for manufacturing useful hydrocarbon derivatives from olefins such as propylene, the butylenes and the amylenes which are derived from more or less waste products by catalytically polymerizing the olefins to the desired higher boiling hydrocarbons.

The process of the present invention is an improvement upon prior known processes as referred to above, and comprises in general the steps of extracting the olefin content from a gaseous mixture by means of a liquefied solvent such as sulfur dioxide, ethyl chloride and difluoro-dichloro-methane which has a selective action on the olefin, recovering the olefin as a liquid dissolved in the solvent at a relatively high pressure, and passing it at a relatively low polymerizing temperature in intimate contact with a polymerization catalyst such for example as aluminum chloride or phosphorus pentoxide, to polymerize the olefin to a higher boiling hydrocarbon. Other selective solvents may be used such as the alkyl dichloro ethers (isopropyl, isobutyl or isoamyl).

In previously known processes the polymerization of olefin hydrocarbons is almost invariably carried out in the vapor phase and in many instances extremely high temperatures and pressures are employed so that large scale expensive equipment has been found necessary. According to the features of the present invention, it is contemplated that while reasonably high pressures may be used, the temperatures employed are only of the order of from 200° to 400° F., and since the operation is carried out in the liquid phase, large and expensive equipment such as that for handling gases is not necessary. A further advantage is obtained by effecting the polymerization in the presence of a non-hydrocarbon solvent which does not enter into the reaction, and in the absence of the saturated hydrocarbons invariably present in gas mixtures from which olefins are obtained.

As an example of the process of the present invention, a relatively dry mixture of gases obtained from the cracking of gas-oil at a high temperature is suitable for extraction with a selective solvent such as liquid sulfur dioxide to selectively remove the olefin hydrocarbons from the gas mixture. A typical gas mixture has approximately the following composition in volume per cent:

| | |
|---|---:|
| Methane | 38.81 |
| Ethane | 13.15 |
| Ethylene | 20.31 |
| Propane | 3.68 |
| Propylene | 13.50 |
| Butanes and butylenes | 6.43 |
| Pentanes, amylenes and higher | 2.47 |

From the above table it will be noted that the olefins apparently comprise some 35 or more per cent of the gas mixture. The extract from such a mixture containing very little of the saturated hydrocarbons is passed in liquid phase in intimate contact with an aluminum chloride catalyst deposited on clay in a reaction zone maintained at a temperature of 100° F. or higher, depending on the reaction time. The reaction zone and time of contact is so arranged that every portion of the extract is reacted for at least three minutes.

After the mixture has received its full length of contact time in the reaction zone it is conducted to a separator where the pressure is reduced to allow vaporization of the sulfur dioxide and any of the unreacted low boiling olefins. The separated sulfur dioxide and unreacted olefins are recompressed and given a second treatment or returned to the original operation to extract additional olefins from a new quantity of gas. The process is preferably carried out continuously so that a continuous stream of the gas is being extracted.

The olefin derivatives comprising the reaction product are a mixture of hydrocarbons, most of which are unsaturated and some of which are aromatic. The mixture may be separated into the various individual derivatives or fractions by fractional distillation.

In some instances it may be desirable to hydrogenate the olefin derivatives obtained in the above-mentioned operation (in the presence of a catalyst) in order to convert them into saturated or more completely saturated hydrocarbons where such is desired.

Another example illustrating more specifically the features of the improved process for the manufacture of benzene involves the steps of obtaining a sulfur dioxide solution of ethylene and a sulfur dioxide solution of butadiene and mixing the two solutions to form the mixture to be subjected to treatment. This mixture under a substantial pressure to maintain the liquid phase is conducted through a reaction zone and brought in intimate contact with a deposit of phosphoric acid on Fuller's earth or activated clay maintained at a temperature of approximately 300° F. The time of reaction should be approximately 2½ minutes and after the reaction is completed the pressure is reduced to remove the sulfur dioxide and unreacted low molecular weight constituents leaving the benzene product as a liquid.

In carrying out this operation it appears that the ethylene and butadiene combine in equal molecular proportion to produce cyclohexene which is finally converted to benzene with the elimination of hydrogen. Butadiene is not produced to any great extent in ordinary cracking operations, but may be produced by the direct decomposition or dehydrogenation of butylene.

Various relatively high molecular weight hydrocarbons containing from six to twelve carbon atoms to the molecule may be produced from gases of the type described above by separately obtaining the individual olefins which are to be reacted to give the desired product or derivative. The mixture of cracking still gases referred to above for example may be fractionated under pressure to produce separate fractions which contain the $C_3$, $C_4$ and $C_5$ hydrocarbons. Ethylene ($C_2$) may be recovered from the gas mixture but very high pressures are required, so that it is preferred to work with the higher members. Each of the fractions may be separately extracted with a selective solvent such as sulfur dioxide to isolate the olefin free of the saturated hydrocarbon. These extracts may be used in various combinations or with other unsaturated compounds to produce different derivatives in accordance with the features of the present invention.

The pressures employed in carrying out the process need not be greater than those necessary to maintain the various constituents and solvent in the liquid phase during the different steps of the operation. However, in certain instances the pressure might advantageously be increased above the necessary point during the reaction in order to be able to use a somewhat lower reaction temperature than might otherwise be required, since it has been found that an increase in the pressure during the reaction permits the use of a lower temperature than otherwise would be necessary.

The reaction time for any particular operation is not to be considered as definite since the reaction time must be considered in connection with the percentage yield per pass and is greatly influenced by the catalyst employed and the temperature of reaction. Aluminum chloride for example has been found to be much more active than Fuller's earth as a catalyst and therefore lower temperatures and shorter times may be employed. Other catalysts which have been found effective in carrying out the process of the present invention are aluminum oxide, zirconium, zirconium dioxide and zirconium peroxide.

The reaction mixture discharged in liquid phase from the reaction zone of the operation may be sent directly to a fractional distilling tower for the removal of the sulfur dioxide and unreacted low moleculer weight olefin or olefins. Where a mixture of hydrocarbon derivatives are obtained they may be fractionated directly in this tower or in a separate tower. It is apparent however that a fractionating tower is advantageous in removing the sulfur dioxide or other solvent and low molecular weight olefins, since the pressure and temperature may be accurately controlled to prevent the loss of any of the desired hydrocarbon derivatives.

Certain of the catalysts may become contaminated or inactivated, but they may be revivified in accordance with the usual practice. All that is necessary is to provide a spare catalyst reaction chamber so that one of them may be blown with air to reactivate the catalyst while the other is being used. Instead of retaining the catalyst in a reaction chamber somewhat better control is obtained by mixing the catalyst in finely divided form with the liquid mixture to be reacted, and passing the whole suspension through a heating coil as a stream, the coil being of sufficient length to give the desired time for effecting the combination and transformation reactions.

From the foregoing description, it is apparent that various valuable commercial products may be made by the process of the present invention. For example, isoctane may be made by reacting a solution of isobutylene to produce diisobutylene and hydrogenating the diisobutylene.

Having described the invention in its preferred form, what is claimed as new is:

1. In a process for making a hydrocarbon olefin derivative containing from approximately six to twelve carbon atoms in which the olefin is obtained from a normally gaseous mixture containing undesired saturated hydrocarbons, the improvement which comprises extracting the said mixture containing an olefin and saturated hydrocarbons with a non-hydrocarbon selective solvent for the olefin to selectively remove the olefin from the mixture, passing the olefin in solution in said solvent through a reaction zone in intimate contact with a polymerization catalyst adapted to polymerize said olefin and produce a hydrocarbon derivative thereof of higher molecular weight, maintaining said catalyst and solvent mixture brought in contact therewith at a temperature of from 100% to 400% F. which is particularly adapted to effect said polymerization reaction, and separating the resulting hydrocarbon derivative from said solvent.

2. In a process for making hydrocarbon derivatives containing from approximately six to twelve carbon atoms to the molecule from olefins in which the olefins are obtained from a mixture of cracked gases produced in the cracking of petroleum oil and which contain saturated hydrocarbons, the improvement which comprises extracting the cracked gas mixture with a liquid selective solvent for the olefins to selectively take up the olefin content of said gases without substantially dissolving the saturated hydrocarbons, passing the resulting solvent mixture containing dissolved olefins in liquid phase through a reaction zone in intimate contact with a polymerization catalyst adapted to polymerize said olefins to produce higher molecular weight derivatives thereof, polymerizing said olefins in said zone at a relatively low polymerizing temperature, and separating the resulting higher molecular weight derivatives containing from approximately six to twelve carbon atoms to the molecule from the solvent and any unreacted olefins contained therein.

3. The improved process as defined by claim 1 in which the polymerization catalyst is a phosphoric acid.

4. The improved process as defined by claim 1 in which the solvent mixture containing the dissolved olefin is maintained in liquid phase in the reaction zone by maintaining a sufficient superatmospheric pressure thereon.

5. In a process for making a hydrocarbon derivative from a normally gaseous olefin, the improvement which comprises dissolving the normally gaseous olefin under pressure in a selective solvent therefor which is a gas at normal pressures and temperatures, passing the resulting mixture of solvent and olefin in liquid phase through a heated reaction zone in intimate contact with a polymerization catalyst and therein polymerizing said olefin at a temperature of from 100° to 400° F. to produce a hydrocarbon derivative of higher molecular weight containing from approximately six to twelve carbon atoms, and separating the resulting hydrocarbon derivative from the solvent by permitting the solvent to vaporize from the reaction mixture.

6. In a process for making a hydrocarbon derivative from normally gaseous olefins of different molecular weight, the improvement which comprises forming a mixture comprising two of such olefins dissolved in a selective liquefied normally gaseous solvent therefor, passing the resulting mixture in liquid phase into a reaction zone in intimate contact with a polymerization catalyst maintained at a relatively low polymerization temperature below approximately 400° F. whereby said olefins of different molecular weight are combined with each other to produce a hydrocarbon derivative of still higher molecular weight containing from approximately six to twelve carbon atoms, and separating the resulting higher molecular weight product from said solvent.

7. In a process for making hydrocarbon derivatives of olefins as defined by claim 2 in which said resulting higher molecular weight derivatives are separated from the solvent and unreacted olefins by distilling the mixture to vaporize the unreacted olefins and solvent and returning the thus separated solvent and olefins to the process for retreatment of the unreacted olefins therein.

8. In the process of manufacturing benzene from olefins, the improvement which comprises mixing a solution of ethylene with a solution of butadiene, passing the mixture through a reaction zone in intimate contact with a polymerization catalyst maintained at a temperature of approximately 300° F. for a reaction time of approximately 2½ minutes, removing the products from the reaction zone and separating out the benzene as a product of the reaction.

9. In the process of making hydrocarbon derivatives of olefins from a mixture of hydrocarbon gases containing $C_3$, $C_4$ and $C_5$ olefins and saturated hydrocarbons, the improvement which comprises fractionating the mixture of hydrocarbon gases and obtaining separate fractions containing respectively $C_3$, $C_4$ and $C_5$ hydrocarbons, extracting each of said fractions with a non-hydrocarbon selective solvent for the olefins and thereby separating the olefin hydrocarbons from the saturated hydrocarbons to produce separate olefin extracts containing respectively $C_3$, $C_4$ and $C_5$ olefins dissolved in the selective solvent, passing at least two of the said extracts dissolved in the selective solvent together through a reaction zone in intimate contact with a polymerization catalyst and interpolymerizing said olefins therein at a relatively low polymerizing temperature to produce hydrocarbon derivatives of higher molecular weight than either of the olefin fractions introduced into said zone, said derivatives comprising hydrocarbons containing from six to twelve carbon atoms to the molecule.

10. The process of making benzene which comprises forming a mixture of ethylene and butadiene in a selective solvent therefor, passing the resulting mixture in liquid phase into a reaction zone in intimate contact with a polymerization catalyst maintained at a relatively low polymerization temperature below approximately 400° F. whereby said ethylene and butadiene are combined with each other to produce benzene, and separating the resulting benzene product from the solvent.

11. In the process of manufacturing benzene from olefins, the improvement which comprises mixing ethylene with butadiene and passing the mixture through a reaction zone in intimate contact with a polymerization catalyst maintained at a temperature below approximately 400° F. and adapted to interpolymerize the ethylene and butadiene to produce benzene, removing the products from the reaction zone and separating out the benzene as a product of the reaction.

HENRY N. LYONS.